(12) United States Patent
Katrini et al.

(10) Patent No.: US 8,459,720 B2
(45) Date of Patent: Jun. 11, 2013

(54) FOLDING SLIDING ROOF

(75) Inventors: Waleri Katrini, Bietigheim-Bissingen (DE); Marcus Papendorf, Boennigheim (DE); Berthold Klein, Sachsenheim (DE); Hubert Kaesweber, Ludwigsburg (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 26 days.

(21) Appl. No.: 13/333,113

(22) Filed: Dec. 21, 2011

(65) Prior Publication Data
US 2012/0161466 A1    Jun. 28, 2012

(30) Foreign Application Priority Data
Dec. 24, 2010   (DE) .......................... 10 2010 056 245

(51) Int. Cl.
*B60J 7/02*    (2006.01)

(52) U.S. Cl.
USPC ..................................... 296/107.13

(58) Field of Classification Search
USPC ............ 296/107.01, 107.07, 107.08, 107.09, 296/107.11, 107.13, 107.16, 107.19
See application file for complete search history.

(56) References Cited

U.S. PATENT DOCUMENTS

| | | | |
|---|---|---|---|
| 6,305,734 B1 * | 10/2001 | Pecho et al. | 296/107.01 |
| 7,258,388 B2 * | 8/2007 | Mori et al. | 296/107.09 |
| 2006/0232098 A1 * | 10/2006 | Theuerkauf | 296/108 |

* cited by examiner

*Primary Examiner* — H Gutman
(74) *Attorney, Agent, or Firm* — Brooks Kushman P.C.

(57) ABSTRACT

A folding sliding roof for a convertible vehicle includes a top fabric, a guide rail, a sliding top bow, and a corner bow. The sliding top bow is connected to the top fabric and is displaceably mounted to the guide rail to move the top fabric between closed and opened positions. The corner bow is connected to the top fabric and is pivotably mounted on the guide rail about a pivot axis.

20 Claims, 1 Drawing Sheet

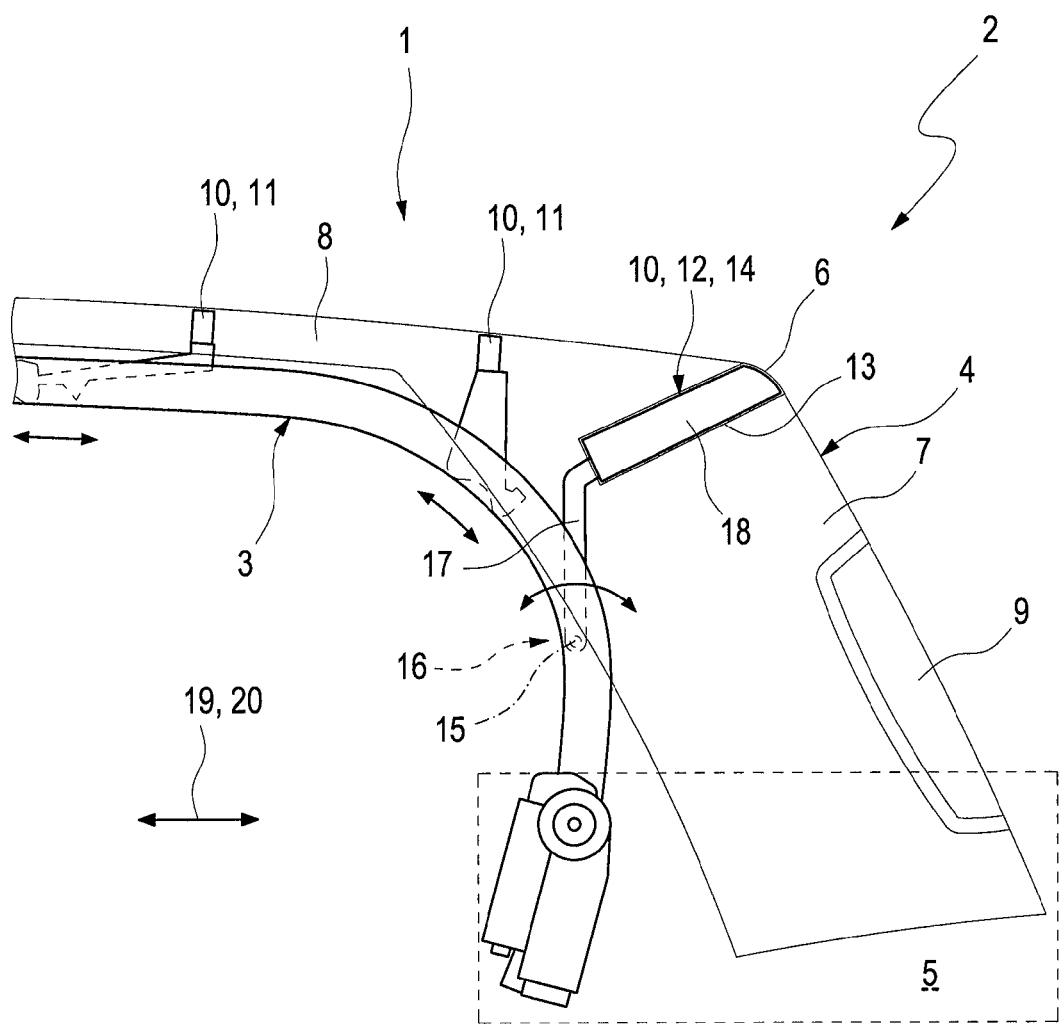

FOLDING SLIDING ROOF

CROSS-REFERENCE TO RELATED APPLICATIONS

This application claims foreign priority benefits under 35 U.S.C. §119(a)-(d) to DE 10 2010 056 245.9, filed Dec. 24, 2010, which is hereby incorporated by reference in its entirety.

TECHNICAL FIELD

The present invention relates to a folding sliding roof for a convertible vehicle.

BACKGROUND

A folding sliding roof for a convertible vehicle is movable between a closed position in which the roof covers the vehicle compartment and an opened position in which the roof is folded and stowed in a storage space in the rear of the vehicle to thereby expose the vehicle compartment. The roof includes a top fabric (a fabric cover) and convertible top bows. Two guide rails are positioned respectively on the left and right longitudinal sides of the vehicle. The top bows extend transversely to the longitudinal direction of the vehicle between the guide rails and are connected to the guide rails. The top bows are connected to and support the top fabric. The top bows stretch the top fabric over the vehicle compartment in the closed position. The top fabric is adjustable between the closed and opened positions with the aid of the top bows.

The top bows include sliding top bows. The sliding top bows enable the adjustability of the top fabric between the closed and opened positions. The sliding top bows are displaceably mounted on the guide rails by their ends. Another one of the top bows is a corner bow that is connected to a transition region of the top fabric. The transition region makes a transition between a rear section of the top fabric and a roof section of the top fabric in the closed position. The transition region is square-cut whereby the vehicle compartment has a relatively large amount of headroom in the region of a rear-window shelf when covered by the top fabric.

A problem with such a folding sliding roof lies with the placement of the top fabric in the opened position. It is desirable that storage of the top fabric be placed as low as possible as this results in an essentially unobstructed line of sight to the rear. But it is particularly inconvenient that the corner bow has to be moved, since it takes up a relatively large amount of space.

SUMMARY

An object of the present invention includes a folding sliding roof which has a simple structure and enables a space-saving placement of the top fabric in the opened position.

In carrying out at least one of the above and other objects, the present invention provides a folding sliding roof for a vehicle. The roof includes a top fabric, a guide rail, a sliding top bow, and a corner bow. The sliding top bow is connected to the top fabric and is displaceably mounted to the guide rail to move the top fabric between closed and opened positions. The corner bow is connected to the top fabric and is pivotably mounted on the guide rail about a pivot axis.

Further, in carrying out at least one of the above and other objects, the present invention provides a convertible vehicle. The vehicle includes a vehicle body having a passenger compartment and a rearward storage space. The vehicle further includes first and second guide rails positioned respectively on left and right longitudinal sides of the vehicle body. The vehicle further includes a folding sliding roof movable between a closed position in which the roof covers the vehicle compartment and an opened position in which the roof is folded and stowed in the storage space. The roof includes a top fabric, a sliding top bow, and a corner bow. The sliding top bow and the corner bow are connected to the top fabric and extend transversely to the longitudinal direction of the vehicle body between the guide rails. The sliding top bow is displaceably mounted to the guide rails to move the top fabric between the closed and opened positions and the corner bow is pivotably mounted on the guide rails about a pivot axis to enable the top fabric to move between the closed and opened positions.

Embodiments of the present invention are directed to a folding sliding roof (i.e., a folding top) for a convertible vehicle. First and second guide rails are positioned respectively on the left and right longitudinal sides of the vehicle. The roof is mounted to the vehicle body and is movable between a closed position in which the roof covers the vehicle compartment and an opened position in which the roof is folded and stowed in a storage space in the rear of the vehicle body to thereby expose the compartment. The roof includes a top fabric (i.e., a fabric cover) and convertible top bows. The top bows extend transversely to the longitudinal direction of the vehicle body between the guide rails and are connected to the guide rails. The top bows are connected to and support the top fabric. The top bows stretch the top fabric over the vehicle compartment in the closed position. The top fabric is adjustable between the closed and opened positions with the aid of the top bows.

Some of the top bows are sliding top bows. The sliding top bows are displaceably mounted by their ends on the guide rails to enable the adjustability of the top fabric between the closed and opened positions. One of the top bows is a corner bow that is connected to a transition region of the top fabric. The transition region of the top fabric makes a transition in the closed position between a rear corner section of the top fabric and a front roof section of the top fabric.

The corner bow is designed as a pivoting top bow. The pivoting top bow is pivotably mounted by each of its two ends on the guide rails about a pivot axis. As such, the corner top bow is formed not as a sliding top bow, but as the pivoting top bow. As noted, the pivoting top bow is characterized by its ends being mounted pivotably around a pivot axis. In particular, the ends of the pivoting top bow are respectively pivotably mounted directly on the guide rails about the pivot axis. The pivot axis is fixed in position with respect to the guide rails. It is thus possible to avoid additional cumbersome measures for mounting the pivoting top bow and to avoid a cumbersome kinematic mechanism for adjusting the pivoting top bow.

In an embodiment of the present invention, the corner bow (i.e., the pivoting top bow) is on an inner side of the top fabric and can thereby stretch the top fabric from the inside to the outside in a particularly simple manner.

In an embodiment of the present invention, the corner bow (i.e., the pivoting top bow) has two straight end sections and a curved middle section. The curved middle section connects the end sections together. The end sections pass straight and parallel to one another. The end sections are pivotably mounted on the respective guide rails to pivotably mount the corner bow to the guide rails. The curved middle section, which requires a relatively large amount of storage space, can be relatively simply pivoted over the end sections and relatively far in the downward direction during the opening of the top fabric. The end sections thereby enlarge the pivot radius as practicable for the curved middle section without requiring much storage space to do so.

The top fabric is connected to the corner bow (i.e., the pivoting top bow) only in the region of the curved middle section of the corner bow. In particular, no binding occurs between the corner bow and the top fabric in the region of the end sections of the corner bow. A relative motion between the top fabric and the end sections is thereby possible for the adjustment process, which simplifies the kinematics.

In an embodiment of the present invention, the top fabric has a tubular pocket. The curved middle section of the corner bow (i.e., the pivoting top bow) passes through the tubular pocket of the top fabric to thereby connect the top fabric to the corner bow only in the region of the curved middle section. The connection between the top fabric and the corner bow can be implemented especially simply in this manner. On the one hand, this connection enables relative movement and a rotation between the corner bow and the top fabric. On the other hand, this connection causes an entrainment of the top fabric during the pivoting of the corner bow or a pivoting of the corner bow during movement of the folding top.

In an embodiment of the present invention, the rear section of the top fabric contains a rear window. The rear window can be made of plastic or glass.

In an embodiment of the present invention, the pivot axis about which the corner bow (i.e., the pivoting top bow) is pivotably mounted to the guide rails extends horizontally and transversely to the longitudinal axis of the roof. The longitudinal axis of the roof passes parallel to the longitudinal axis of the vehicle.

In an embodiment of the present invention, the guide rails are stationary guide rails. In this case, the guide rails form side roof frames for the closed and opened top fabric which extend from the vehicle windshield to the vehicle C-pillars. Alternatively, in an embodiment of the present invention, the guide rails are adjustable guide rails. The adjustable guide rails are movable for moving the roof including the top fabric between the closed and opened positions.

The above features, and other features and advantages of the present invention are readily apparent from the following detailed description thereof when taken in connection with the accompanying drawing. It is understood that the features stated above and to be explained below may be used not only in the particular stated combination, but also in other combinations or alone without departing from the scope of the present invention.

Exemplary embodiments of the present invention are illustrated in the drawings and explained in greater detail in the following description. Identical, similar, or functionally equivalent components are denoted by the same reference numerals.

BRIEF DESCRIPTION OF THE DRAWINGS

FIG. 1 illustrates a schematic side view of a folding sliding roof in the region of a corner bow of the roof in accordance with an embodiment of the present invention.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a schematic side view of a folding sliding roof 1 (i.e., a folding top) for a convertible vehicle 2 in accordance with an embodiment of the present invention is shown. Roof 1 is mounted to vehicle 2 and is movable between a closed position and an opened position. In the closed position, shown in FIG. 1, roof 1 covers the vehicle compartment. In the opened position, roof 1 is folded and stowed in a storage space 5 in the rear of vehicle 2 to thereby expose the vehicle compartment. Storage space 5 is indicated in FIG. 1 by a rectangle drawn with a dashed line.

Roof 1 includes a pair of guide rails 3. One guide rail 3 is positioned on one longitudinal side of vehicle 2. The other guide rail (not shown) is positioned on the other longitudinal side of vehicle 2.

Roof 1 further includes a top fabric 4 (a fabric cover). Top fabric 4 is adjustable with roof 1 between the closed and opened positions. In the opened position, top fabric 4 is placed into storage space 5. Top fabric 4 includes a rear top fabric section 7 and a front top fabric section 8. Top fabric 4 further includes a square-cut transition region 6. Transition region 6 provides a square-cut shape at the rear of top fabric 4 in the closed position. Transition region 6 makes a transition with rear section 7 of top fabric 4 and front section 8 of top fabric 4. In this way, top fabric 4 is given an angled or edged shape in the rear region in the closed position. Rear section 7 contains a rear window 9. Rear window 9 can be flexible or rigid and made of plastic or glass.

Roof 1 further includes a plurality of convertible top bows 10. Top bows 10 extend transversely to longitudinal direction 20 of vehicle 2 between guide rails 3 and are connected to guide rails 3. Top bows 10 are arranged on the inner side of top fabric 4. Top bows 10 are connected to and support top fabric 4. Top bows 10 stretch top fabric 4 over the vehicle compartment in the closed position. Top fabric 4 is adjustable between the closed and opened positions with the aid of top bows 10.

Some of top bows 10 are designed as sliding top bows 11 for the purpose of adjusting top fabric 4 between the closed and opened positions. Sliding top bows 11 are displaceably mounted with their ends on guide rails 3 to enable the adjustability of top fabric 4 between the closed and opened positions. The respective displace-ability of sliding top bows 11 is indicated in FIG. 1 by double headed arrows directed along the respective guide rails 3.

One of top bows 10 is configured as a corner bow 12. Corner bow 12, like the other top bows 10, is arranged on the inner side of top fabric 4. Corner bow 12 extends into and is connected to transition region 6 of top fabric 4. In order to achieve this connection between top fabric 4 and corner bow 12, top fabric 4 includes a tubular-shaped pocket 13 on the inner side of top fabric 4. Corner bow 12 is guided through pocket 13 in order to connect with top fabric 4.

Corner bow 12 is not designed as a sliding top bow. Rather, corner bow 12 is a pivoting top bow 14. Pivoting top bow 14 is pivotably mounted by each of its two ends on guide rails 3 about a pivot axis 15. A corresponding bearing position is indicated by 16 in FIG. 1. Mounting of pivoting top bow 14 thus occurs directly on respective guide rails 3. As such, pivoting top bow 14 can pivot by its ends around pivot axis 15. The pivot-ability of pivoting top bow 14 is shown in FIG. 1 by a double headed arrow.

Pivoting top bow 14 has two straight end sections 17 and a curved middle section 18. Middle section 18 connects end sections 17 to one another. End sections 17 are parallel to one another. Middle section 18 defines the outer contour of transition region 6 of top fabric 4. Middle section 18 extends through pocket 13 of top fabric 4 while end sections 17 pass outside of pocket 13. Top fabric 4 is connected with pivoting top bow 14 only in the region of middle section 18 whereby relative movements are possible between top fabric 4 and end sections 17.

Pivot axis 15 extends perpendicular to the plane of the drawing of FIG. 1 and is thus horizontal and transverse to a longitudinal axis 19 of roof 1. Longitudinal roof axis 19 coincides with longitudinal vehicle axis 20.

Guide rails 3 are designed as stationary guide rails 3. Guide rails 3 thus remain in place and in position during the opening and closing of roof 1 and define, for example, a side roof frame.

Alternatively, guide rails 3 are designed as adjustable guide rails 3. In this case, guide rails 3 are movable for moving roof 1 between the closed and opened positions. In this case, guide rails 3 move into storage space 5 in the opened position.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A folding sliding roof for a vehicle comprising:
   a top fabric;
   a guide rail;
   a sliding top bow connected to the top fabric and displaceably mounted to the guide rail to move the top fabric between closed and opened positions; and
   a corner bow connected to the top fabric and pivotably mounted on the guide rail about a pivot axis.

2. The roof of claim 1 wherein:
   the top fabric includes front and rear sections and a transition region therebetween;
   wherein the corner bow is connected to the top fabric in the transition region of the top fabric.

3. The roof of claim 2 wherein:
   the corner bow is arranged on an inner side of the top fabric.

4. The roof of claim 3 wherein:
   the corner bow has two end sections and a middle section which connects the end sections;
   wherein the middle section of the corner bow is connected to the top fabric and the end sections of the corner bow are disconnected from the top fabric.

5. The roof of claim 4 wherein:
   the end sections of the corner bow are straight and parallel to one another and the middle section of the corner bow is curved.

6. The roof of claim 4 wherein:
   the top fabric includes a tubular-shaped pocket on the inner side of the top fabric;
   wherein the middle section of the corner bow passes through the pocket of the top fabric such that the corner bow is connected to the top fabric.

7. The roof of claim 2 wherein:
   the rear section of the top fabric contains a rear window.

8. The roof of claim 1 wherein:
   the pivot axis extends transversely to a longitudinal axis of movement of the top fabric between the closed and opened positions.

9. The roof of claim 1 wherein:
   the guide rail is stationary and remains in place as the top fabric is moved between the closed and opened positions.

10. The roof of claim 1 wherein:
    the guide rail is movable to move the top fabric via the bows.

11. A vehicle comprising:
    a vehicle body having a passenger compartment and a rearward storage space;
    first and second guide rails positioned respectively on left and right longitudinal sides of the vehicle body; and
    a folding sliding roof movable between a closed position in which the roof covers the vehicle compartment and an opened position in which the roof is folded and stowed in the storage space;
    wherein the roof includes a top fabric, a sliding top bow, and a corner bow, wherein the sliding top bow and the corner bow are connected to the top fabric and extend transversely to the longitudinal direction of the vehicle body between the guide rails, wherein the sliding top bow is displaceably mounted to the guide rails to move the top fabric between the closed and opened positions and the corner bow is pivotably mounted on the guide rails about a pivot axis to enable the top fabric to move between the closed and opened positions.

12. The vehicle of claim 11 wherein:
    the top fabric includes front and rear sections and a transition region therebetween;
    wherein the corner bow is connected to the top fabric in the transition region of the top fabric.

13. The vehicle of claim 12 wherein:
    the corner bow is arranged on an inner side of the top fabric.

14. The vehicle of claim 13 wherein:
    the corner bow has two end sections and a middle section which connects the end sections;
    wherein the middle section of the corner bow is connected to the top fabric and the end sections of the corner bow are disconnected from the top fabric.

15. The vehicle of claim 14 wherein:
    the end sections of the corner bow are straight and parallel to one another and the middle section of the corner bow is curved.

16. The vehicle of claim 14 wherein:
    the top fabric includes a tubular-shaped pocket on the inner side of the top fabric;
    wherein the middle section of the corner bow passes through the pocket of the top fabric such that the corner bow is connected to the top fabric.

17. The vehicle of claim 12 wherein:
    the rear section of the top fabric contains a rear window.

18. The vehicle of claim 11 wherein:
    the pivot axis extends transversely to a longitudinal axis of movement of the top fabric between the closed and opened positions.

19. The vehicle of claim 11 wherein:
    the guide rails are stationary and remain in place as the top fabric is moved between the closed and opened positions.

20. The vehicle of claim 11 wherein:
    the guide rails are movable to move the top fabric via the bows.

* * * * *